United States Patent [19]
Constant

[11] 4,164,740
[45] Aug. 14, 1979

[54] SYNTHETIC APERTURE USING IMAGE SCANNER

[76] Inventor: James N. Constant, 1603 Danbury Dr., Claremont, Calif. 91711

[21] Appl. No.: 897,907

[22] Filed: Apr. 19, 1978

Related U.S. Application Data

[63] Continuation of Ser. No. 663,847, Mar. 4, 1976, abandoned.

[51] Int. Cl.² ............................................... G01S 9/02
[52] U.S. Cl. ................................................. 343/5 CM
[58] Field of Search ................................... 343/5 CM

[56] References Cited

U.S. PATENT DOCUMENTS

| | | | |
|---|---|---|---|
| 3,129,422 | 4/1964 | Fox | 343/5 CM |
| 3,155,964 | 11/1964 | Voles | 343/5 CM |
| 3,560,973 | 2/1971 | Kazel | 343/5 CM X |
| 3,569,967 | 3/1971 | Gendreu et al. | 343/5 CM X |
| 3,691,557 | 9/1972 | Constant | 343/5 CM X |
| 3,725,915 | 4/1973 | Herman et al. | 343/5 CM X |
| 3,727,219 | 4/1973 | Graham | 343/5 CM |
| 3,937,942 | 2/1976 | Bromley et al. | 324/77 K X |
| 3,942,109 | 3/1976 | Crumly et al. | 324/77 K X |

*Primary Examiner*—Malcolm F. Hubler
*Attorney, Agent, or Firm*—Harris, Kern, Wallen & Tinsley

[57] ABSTRACT

In a system for generating a synthetic aperture, a lens or antenna for focusing the radiation from an object scene onto an image sensor which is shifted by a clock at the rate of motion of objects in the object scene and thereby to produce the real time imaging of the object scene with high resolution. A system for reconnaissance, surveillance and ground mapping. A system for high speed data imaging, medical patient scanning, label scanning, and image correlation.

52 Claims, 8 Drawing Figures

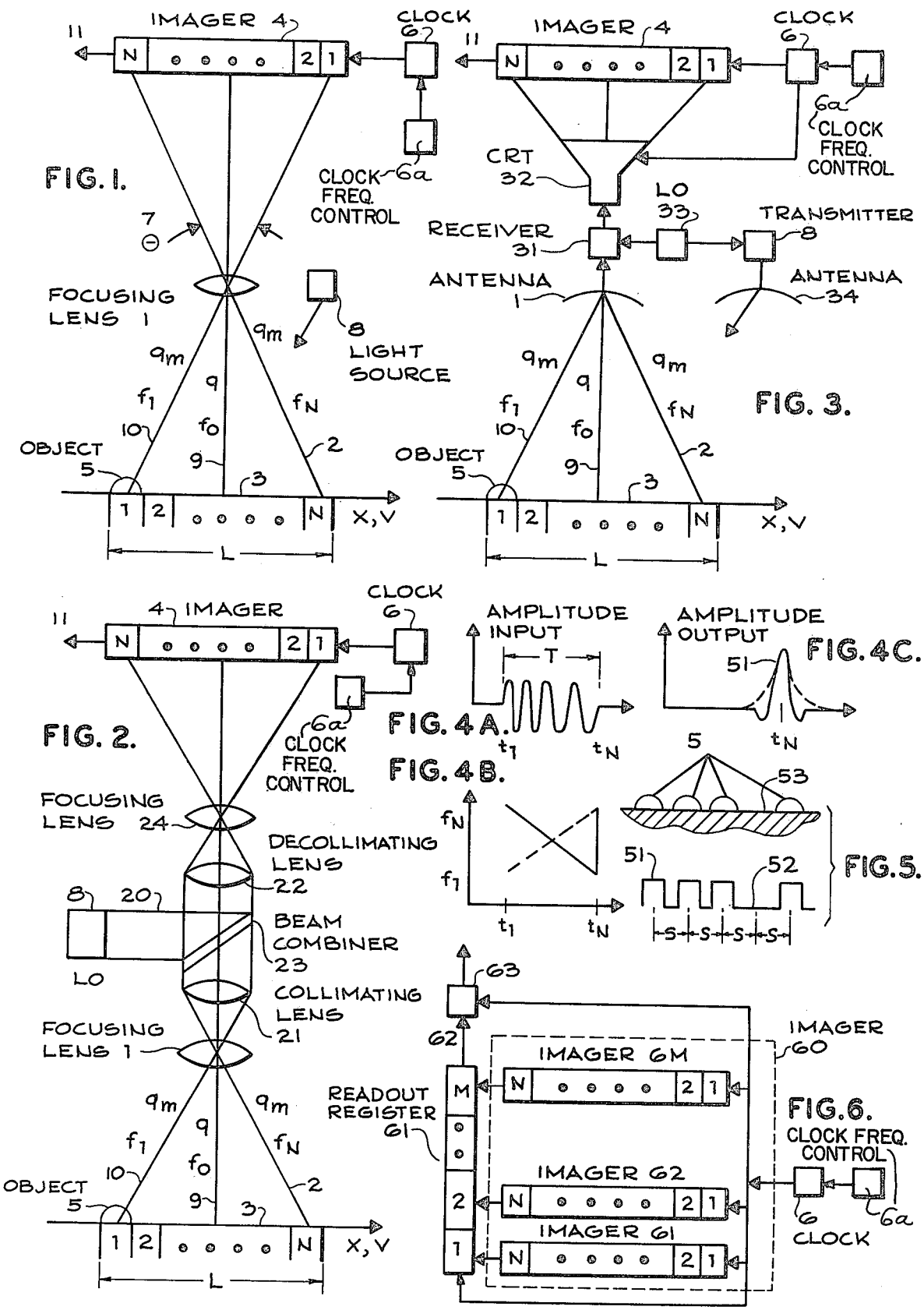

SYNTHETIC APERTURE USING IMAGE SCANNER

This is a continuation of application Ser. No. 663,847, filed Mar. 4, 1976, now abandoned.

BACKGROUND OF THE INVENTION

Since the development of synthetic aperture, attempts have been made to reduce the size, weight, power consumption, and cost of these systems. Basically, a target crossing a radar beam produces a chirp signal at the output of a detector. The chirp signal is then processed electronically in a matched filter in real time or is recorded and then reproduced at a later time in an optical matched filter. The real time operation of the electronic processor is obtained at the expense of large size, weight, and power consumption of the processor while the small size, weight, and power consumption of the optical processor is obtained at the expense of an annoying delay of obtaining images. Examples of conventional synthetic aperture can be found in the paper by L. Cutrona et al., "On the Application of Coherent Optical Processing Techniques to Synthetic Aperture" appearing in the August, 1966 issue of Proc. IEEE, and in the paper by W. Brown and L. Porcello, "An Introduction to Synthetic Aperture Radar" appearing in the September, 1969 issue of IEEE Spectrum. While these systems first record detected signals and then reproduce images in a time consuming two step process, my U.S. Pat. No. 3,691,557 System for Identifying Objects Using an Encoding Array for each Object, U.S. Pat. No. 3,790,939 Real Time Synthetic Radar, U.S. Pat. No. 3,798,644 Vector Velocity System, and U.S. Pat. No. 3,858,203 Synthetic Radiometer and System for Identifying Objects are examples of systems which process their signals electronically in real time.

While all the known apparatus and methods of the prior art have the ability to form synthetic apertures, they have significant inherent disadvantages. For example, systems using optical processing while significantly reducing the size, weight, and power consumption of processors and increasing the data capacity for two dimensional image do so at the expense of a two step recording and then reproducing cycle which often is time consuming in many applications. On the other hand, systems using electronic processing while operating in real time do so at the expense of having large size, weight and power consumption of their signal processors and having a reduced data capacity. Because of these disadvantages, the conventional synthetic aperture has found limited use, mainly in military surveillance, reconnaisance, and ground mapping applications and has found no commercial application whatsoever. It is desired to provide a synthetic aperture apparatus and method that overcomes these disadvantages so that the benefits of synthetic aperture will have a widespread and commercial use. More specifically, it is desirable to provide a synthetic aperture apparatus and method that has a real time operation yet has a small size, weight, power consumption, cost and high data capacity, i.e., combining the best features of the prior art systems while eliminating their disadvantages.

Charge transfer image sensors have been developed using a variety of technologies including solid state (SS), charge coupled devices (CCD), charge injection devices (CID) and bucket brigade devices (BBD). These devices are used to view an object scene or picture and to convert light intensity from the object scene into electrical signals. Transmitted to a remote location, these signals can reproduce an image of the real object scene with high resolution. Linear image sensors consist of a single row of photoelements and, therefore, image a single line of optical information. In a frame, i.e., a number of lines, of optical information is desired either the image or the device must be moved from line to line to obtain the information. Linear image sensors are used in facsimile, slow scan TV, optical character recognition or label reading systems. They also find application in monitoring industrial processors where the processed items are inspected as they pass the linear sensor. Area image sensors, on the other hand, find applications in the imaging of two dimensional object scenes, usually under low light level illuminations and providing compact, light-weight, low power consuming stable operating long life camera systems. Area imagers consist of a rectangular array of photoelements. Like the linear devices there are different methods of reading out the stored video information obtained by the photoelements, for example the information in the photoelements can be read out serially, in serial-parallel and in parallel formats. Image sensors, their architecture and methods of operation have been described in a number of publications including the article by Amelio "Charge Coupled Devices" appearing in the May, 1974 issue of Scientific American, in the article by Solomon "CCD Image Sensors" appearing in Paper 2 presented at the IEEE Western Electronic Show and Convention (WESCON) Los Angeles, Sept. 10–13, 1974, in the article "A new imaging technology grabs hold: Charge Transfer Devices" appearing in the Mar. 15, 1974 issue of Electronics Design and in the article by Deliduka "Enormous Bucket-Brigade Optical Scanner Achieves High Efficiency" appearing in the February, 1976 issue of Computer Design. Commercially available image sensors and associated equipment are shown in the brochure of Reticon Corp., entitled Product Summary Solid State Image Sensors and Systems, published in 1973.

Present image sensors work splendidly when the object or view scene is stationary relative to the sensor and even work in a limited respect as the object scene moves across the sensor's field of view at relatively low speed. However, the capability of present image sensors quickly degrades at speeds beginning to approach the modest value of a small fraction of one kilometer per hour. Thus, while the known apparatus and methods of the present image sensors have the ability to form images at stationary and very low speeds they fail at high image speeds. Moreover, there are not known image sensors for generating a synthetic aperture must less than for generating a synthetic aperture using noncoherent as well as coherent radiations, or for using clock means for signal processing, or for changing the range focusing of the object scene, or for operating at high rates of motion of the object scene, or of operating at other than optical frequencies.

Therefore, it is an object of this invention to provide apparatus and method for generating a synthetic aperture using image scanners.

It is also an object of this invention to provide apparatus and method for generating a synthetic aperture using coherent or non coherent radiations from objects.

It is another object of this invention to provide apparatus and method for processing signals using an image sensor.

It is another object of this invention to provide apparatus and method for an imager which is capable of changing the range focusing of its object scene.

It is another object of this invention to provide apparatus and method for an imager which is capable of operating at acoustical, microwave or optical frequencies.

It is another object of this invention to provide apparatus and method for viewing images using image scanners.

It is another object of this invention to provide apparatus and method for detecting and correlating desired images using image scanners.

It is yet another object of this invention to provide apparatus and method for reading coded labels.

SUMMARY OF THE INVENTION

In accordance with a principle of this invention, an apparatus for generating a synthetic aperture in real time using an image sensor (imager) is provided. The apparatus comprises a focusing lens or antenna of acoustical or electromagnetic energy for forming a receiving beam, an image sensor for detecting signals from the lens and a clock for shifting the image sensor contents at the rate of motion of objects in the object or view scene of the lens. An object in transit of the receiving beam is detected sequentially by each photoelement of the image sensor whose shifting accumulates detected signals from previous photoelements. The output of the image sensor represents the accumulation of detections of the object by the individual photoelements and appears as a pulse at the output of the image sensor with a pulse appearing for each object crossing the receiving beam.

In accordance with another principle of this invention, the apparatus may include a coherent or non coherent transmitter for illuminating objects.

In accordance with another principle of this invention, the apparatus may include a stable local oscillator for referencing received signals.

In accordance with another principle of this invention, the apparatus may include variable clock means for changing the range focusing of objects.

In accordance with another principle of this invention, the apparatus may include an output display having as input the output from said image sensor and for viewing the image of said object scene.

In accordance with another principle of this invention, the apparatus may include a data processor having as input the output from said image sensor and for detecting and correlating desired images of said object scene.

In accordance with a further principle of this invention, the apparatus may include a coded label attached to an object for identifying the object, with a plurality of labels with a label for each object being identified.

In accordance with another principle of this invention, a method for generating a real time synthetic aperture using an image scanner is provided. The method comprises the steps of:

focusing an object scene through a lens or antenna of acoustical or electromagnetic energy onto an image sensor;

detecting signals from objects in the object scene in the image sensor; and shifting the contents of the image sensor at the rate of motion of objects in the object scene of the lens.

In accordance with another principle of this invention, the method also includes the step of illuminating objects with a coherent or noncoherent transmitter.

In accordance with another principle of this invention, the method also includes the step of generating a stable local frequency for referencing signals being detected by the image sensor.

In accordance with another principle of this invention, the method also includes the step of varying the clocking of the image sensor for changing the range focusing of objects.

In accordance with another principle of this invention, the method also includes the step of viewing the output of said image sensor in an output display.

In accordance with another principle of this invention, the method also includes one of the steps of detecting and correlating the output of the image sensor with desired images of said object scene in an output data processor.

In accordance with yet another principle of this invention, the method also includes the steps of:

providing a plurality of coded labels with a label for each object; and attaching labels to objects for identifying objects with a code.

It will be appreciated from the forgoing description that the invention provides apparatus and method for a synthetic aperture using image scanners. The apparatus comprises an image sensor which detects signals from objects through a lens or antenna forming receiving beam which connects the image sensor and objects being viewed in an object or view scene in a space link with clock means for shifting the contents of photoelements in the image sensor at the rate of motion of objects in the object scene of the lens. The method is equally uncomplicated and comprises the steps of focusing an object scene through a lens onto an image sensor, detecting signals from objects in the image sensor, and shifting the image sensor at the rate of motion of objects in the object scene of the lens.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a schematic diagram which illustrates an optical embodiment of the invention using a linear imaging sensor;

FIG. 2 is a schematic diagram of a beam combiner which can be used to operate the system of FIG. 1 as a coherent system;

FIG. 3 is a schematic diagram which illustrates one of a microwave or acoustical embodiments of the invention using a linear imaging sensor;

FIGS. 4A, 4B, 4C illustrate, by way of example the relationships of spatial input signals to the image sensor of FIGS. 1, 2, 3;

FIG. 5 is a time plot which illustrates the relationships existing between objects and pulses which appear at the output of the image sensor of FIGS. 1, 2, 3; and FIG. 6 is a schematic diagram which illustrates an embodiment of the image sensor of FIGS. 1, 2, 3 as an area image sensor.

DESCRIPTION OF THE PREFERRED EMBODIMENTS

FIG. 1 illustrates a focusing lens 1 forming a receiving beam 2 for viewing an object scene 3 spanning the distance L at the range q from lens 1. Lens 1 focuses object scene 3 upon image sensor 4 shown as a linear image sensor having N photoelements. An object 5 moves in the direction x at speed v and occupies successive positions 1-N corresponding to time $t_1-t_N$ in object scene 3. As object 5 moves from left to right its radiation is detected by successive photoelements 1-N in imager 4. A clock 6 is used to shift detected signals in imager 4 at the rate of motion of object 5. Thus, not only is object 5 detected successively in photoelements 1-N as it transits object scene 3 but the successive detections accumulate synchronously from element to element in imager 4 due to the synchronous shifting of clock 6 whose effect is to transfer the detected charges from previous photoelements to the instant photoelement. Alternatively, the detected charges may be transferred to the output 11. For example, object 5 at location N in object scene 3 is detected by photoelement N in imager 4 which also contains the detections by previous photoelements $1-(N-1)$ these having been synchronously shifted in imager 4 by clock 6 at the rate of motion of object 5.

Focusing lens 1, imager 4 and clock 6 are found in conventional image sensors and may be any of the well known units. The lens or antenna may be an antenna type structure used at acoustical frequencies or used at microwave or millimeter frequencies or may be a lens type device used at infrared and optical frequencies. The lens or antenna has a beamwidth $\theta$ 7 and may be scanned by conventional techniques if desired, although this type scanning is not central to the invention. In some applications a light source or transmitter 8 may be used to illuminate object scene 3. Light source 8 may be coherent or non coherent as desired.

It will be appreciated by those in the art that the system of FIG. 1 will generate a synthetic aperture in accordance with the system of the invention. This is done by using the combination of image sensor 4 and clock 6 to obtain an image scanner. Normally, each photoelement in imager 4 detects a charge due to object 5 which is proportional to the amount of photons of the incident light. This corresponds to both the brightness of the light and the illumination or shine time, i.e., the time object 5 illuminates the instant photoelement. As long as the accumulating charge does not saturate the photoelement it represents integrated charge over the shine time. Although it is sufficient to operate the system in this manner, this process is a noncoherent one which inherently neglects the phase of the signal, especially when the light from object 5 is itself coherent, in which case of coherent signals it is possible to operate the system coherently. To preserve the signal phase it is necesary to have coherent signals from object 5, for example having a laser transmitter 8 for illuminating object 5 and illuminating imager 4 with a reference beam from coherent transmitter 8 or from a separate coherent source or from a stable local oscillator.

FIG. 2 shows, by way of example, how a reference beam 20 from a transmitting or stable local oscillator 8 can be combined with signal beam 2. This is done by inserting a collimating lens 21, decollimating lens 22, beam combiner 23 and focusing lens 24 between focusing lens 1 and image sensor 4. The result is that reference beam 20 combines with signal beam 2 in beam combiner 23 and both beams illuminate imager 4. As before, each photoelement of imager 4 detects the signal from object 5 excepting now the detected signals are coherent resulting from the radiation beam 2 and reference beam 20 so that the phase of the signal now determines the charge in each photosensor. The variation of the phase from element to element in imager 4 is in the form of a spatial chirp signal when the relative speed v of object 5 is uniform. Since the radial doppler frequency of object 5 determines the signal phase, the charge in each photoelement is greatest for those elements wherein the signal and reference beams are in phase and least for those elements wherein these are out of phase.

FIG. 3 illustrates a receiving antenna 1 forming a receiving beam 2 for viewing an object scene 3 spanning the distance L at range q. An object 5 moves in the direction x at speed v and occupies successive positions 1-N at times $t_1-t_N$ in object scene 3. As object 5 moves from left to right its radiation is detected by a receiver 31 through antenna 1. The output of the receiver is used to intensity modulate a cathode ray tube 32 whose output illuminates imager 4. A clock 6 is used to shift detected signals in imager 4 at the rate of motion of object 5, and also to synchronize the scanning of cathode ray tube 32. Thus, object 5 is detected successively in photoelements 1-N of imager 4 as it transits locations 1-N in object scene 3 and the successive detections accumulate synchronously from element to element in imager 4 due to the synchronous shifting of clock 6 whose effect is to transfer the detected charges from previous photoelements to the instant photoelement or alternatively, to the output 11. In some applications a transmitter 8 may be used to illuminate object scene 3. Transmitter 8 may be coherent or noncoherent and may operate at acoustical or microwave frequencies as desired. It should be understood that although the system of FIG. 3 is shown using dual antennas for transmissions and receptions, the system can be implemented using a common antenna equally well. In other applications, a stable local oscillator 33 may be used as a common reference source for both the transmitter 8 and receiver 31, i.e., the radar may be coherent.

It will be recognized by those in the art that the system of FIG. 3 just described is that of a conventional synthetic aperture radar in which the recording film has been replaced by imager 4 and clock 6. Any of the well known units of conventional synthetic aperture may, therefore, be utilized to implement the invention provided its recording film is replaced by imager 4 and clock 6 in accordance with the system of the invention. Except for its operation at acoustical or microwave frequencies, the system of FIG. 3 operates in the same manner of the optical systems of FIGS. 1 and 2, i.e., as either a coherent or noncoherent system for generating a synthetic aperture using image scanners.

Turning now to a more detailed description of the system operation, an object 5 moves in the direction x relative to a lens or antenna 1. The shortest range between the object 5 and lens or antenna 1 is q and $q_m$ is the maximum slant range viewed by the beamwidth $\theta$ 7. It is a well known fact of conventional synthetic aperture that the doppler shift $f_D$ of the signal from object 5 is proportional to the distance between object 5 and the line of symmetry 9. This fact is the basis upon which it becomes possible to generate a synthetic aperture coherently. Thus, in a conventional synthetic aperture the signals from object 5 are focused by a focusing lens or antenna 1 onto a film traveling at the synchronous speed of object 5 and replacing imager 4 and clock 6. The film is subsequently processed in an optical or electronic processor to reproduce the image of each object 5 crossing beam 2. Thus, while in a conventional synthetic aperture the signals must be processed in a two step time consuming process following their recording on film or in a limited data capacity electrical matched filter following their detection, there is no further need for such post detection processing of signals in the present invention since imager 4 serves the dual role of a detector and signal processor and can be implemented as a matched filter, correlator, convolver of its input signal from object 5. In either case, a synthetic aperture is generated; in the conventional case by recording on film and optically reproducing images using a high data capacity optical computer or by first detecting and electrically reproducing images using a low data capacity electronic processor while in the present invention the processing is accomplished by synchronously detecting and electrically reproducing images using a high data capacity imager 4 shifted by clock 6 in synchronism with the motion of object 5.

The signals in the wavefront which appears across the face of imager 4 in time sequence $t_1$-$t_N$ as object 5 crosses beam 2 in the direction x follow paths 10, 9, 2 in the sequence given. The signals in paths 10, 9, 2 are shown traced through lens or antenna 1 and eventually falling on imager 4. The signals in paths 10, 9, 2 are characterized as each having the same coherent frequency when the object 5 itself is a coherent source or each having the same spectral distribution when the object 5 itself is a noncoherent source. The particular signal in path 9 remains unchanged in its coherent frequency or spectral distribution as object 5 crosses line 9. All other signals in other paths are shifted according to the doppler law. Shown in FIGS. 1, 2, 3 are the frequencies $f_1$, $f_o$, $f_N$ which correspond to the three paths 10, 9, 2, respectively. Thus the signals, whether these be coherent or not, which appear at the face of imager 4 all have carrier $f_o$ excepting that they are shifted in doppler according to their displacement away from the particular path 9. The photosensing of signals is accomplished in the individual photoelements of imager 4 and is made synchronously, i.e., object 5 at location 1 of object scene is detected by photoelement 1 in imager 4 and so forth and the individual detections of object 5 by individual photoelements are integrated by shifting imager 4 using clock means 6. In many applications, a transmitting or stable local oscillators 8, 33 may be used to provide a stable reference, intermediate frequency (IF) operation or as a local oscillator in a heterodyne receiver, or to provide active transmissions, or as one means for obtaining target range, range resolution, and two-dimensional scanning of object scene 3. Any of the well known types of transmitting or stable local oscillators 8, 33 may be utilized to implement the invention.

FIGS. 4A, 4B, 4C show, by way of example, the relationships between the input and output signals to imager 4. If object 5 crosses beam 2 at uniform speed v in the direction x, the doppler modulation of the signal from object 5 produces the signal shown in FIG. 4A at the face of imager 4, i.e., appearing in the photoelements of imager 4. The signal decreases uniformly between frequency $f_1$ at time $t_1$ (when object 5 enters beam 2) to frequency $f_N$ at time $t_N$ (when object 5 leaves beam 2) so that $t_N-t_1=T$ is the time duration of the signal and t is the instant time, $f_N-f_1=B$ is the doppler or information bandwidwidth of the signal and f is the instant frequency. As shown in the sloping solid line of FIG. 4B, the spatial signal appearing in the photoelements of imager 4 is, therefore, a linear downchirp. The signal is asynchronous in the sense that it appears in imager 4 whenever an object 5 crosses beam 2. Succesive objects 5 produce successive chirp signals, i.e., inputs to imager 4. As before, when object 5 is at location N in object scene 3 photosensor N in imager 4 accumulates a charge which represents the sum or integral of charges detected by the individual photoelements 1–N. In a coherent operation of the system of the invention, the phase of signals, i.e., the phase variation of FIG. 4A, is preserved and the integration of charges in the individual photoelements of imager 4 is coherent. In a noncoherent operation of the system of the invention, the phase of signals is not preserved and the integration of charges in the individual photoelements of imager 4 is noncoherent. In either case an integration takes place and benefits result from such operation of the system, i.e., from the coherent or noncoherent operation of the system.

It is desired that clock 6 synchronize the outputting of charges from imager 4 due to a single object 5 crossing beam 2, as shown by the vertical solid line of FIG. 4B. To achieve this result, imager 4 must have the frequency-time characteristic shown by the sloping dashed line of FIG. 4B. Thus, the required synchronization of the spatial signal shown in FIG. 4A and represented by the sloping solid line in FIG. 4B is accomplished by shifting clock 6 at the rate of motion of object 5 and represented by the sloping dashed line in FIG. 4B and for which shifting imager 4 can be viewed as a spatial weighted vector processor, or a matched filter or correlator processor. For whichever viewpoint is chosen, a particular architecture, readout and frequency setting of clock 6 will be used to synchronize the charges and in this manner to produce a pulse at the output 11 of imager 4. The synchronized, i.e., integrated, signal appearing at the output 11 of imager 4 is shown as the solid pulse of FIG. 4C and is shown as a sinx/x pulse with $x=\pi B/(t-t_o)$ and having a pulse width of 1/B as measured at the half-power points. It is a well known fact that this type pulse can be produced when the object 5 signal has the form of FIG. 4A and described by the sloping solid line of FIG. 4B and the clock 6 cycles at a rate which produces the characteristic given by the sloping dashed line in FIG. 4B. While the conventional synthetic aperture implements its processor as an optical matched filter for reproducing images from a film in a two step time consuming process with high data content or in an electrical matched filter with low data content, the present invention implements its processor in the form of imager 4 and clock means 6 acting as an opto-electric matched filter with high data content. In this manner, the system of the invention provides the best features of the prior art (real time operation with high data capacity) without having the latter's disadvantages (real time operation with low data capacity and high data capacity in a two step off-line processing). The dashed line pulse illustrated in FIG. 4C represents the time sidelobes which result when the input pulse shown in FIG. 4A has been tapered, unintentionally by the gain of beam 2 or intentionally by inserting a spatial amplitude filter between lens 1 and imager 4, as most likely will be the case in practice. These sidelobes are always significantly below those shown for the sinx/x pulse solid line of FIG. 4C which corresponds to the flat pulse of FM, shown by way of example, in FIG. 4A.

It will be appreciated by those in the art that the relationships of input, matching and output characteristics of imager 4, suggested by FIGS. 4A, 4B, 4C are only approximate in practice. For example, the only delays of signals considered by the sloping solid line of FIG. 4B are those due to object 5 crossing beam 2 at uniform speed. In practice, additional time delays are present and these tend to produce a nonlinear frequency-time input characteristic. One example of an additional time delay is that due to the longer path 10 compared to path 9. Also, an object 5 which crosses beam 2 at nonuniform speed produces a nonlinear input frequency-time characteristic. Moreover, the slope of the input characteristic, i.e., sloping solid line in FIG. 4B, will change with the distance q or with object 5 crossing beam 2 at an angle. Thus, in practice, the actual input characteristic will most likely differ from the linear chirp signal of FIG. 4A, shown by way of example. In any case, it is a straightforward task to accomodate such deviations from the linear example of FIGS. 4A, 4B, 4C with similar results, i.e., for whichever the actual form of the input frequency-time characteristic, i.e., the sloping solid line of FIG. 4B, the corresponding matched characteristic, i.e., sloping dashed line of FIG. 4B can be obtained by operating clock 6 at the desired rate to obtain the desired integration of signals appearing in imager 4. Thus, clock 6 can be used to shift photoelements of imager 4 linearly or nonlinearly in time as the application dictates.

Clock means 6 shifts photoelements of imager 4 at the synchronizing frequency F given by $$F = N v/L \tag{1}$$

which is valid for the linear case of FIGS. 4A, 4B, 4C. Clearly then, for a fixed number of photoelements N and speed v of object 5, the frequency F is dependent upon the distance L spanning object scene 3, i.e., since L itself depends on the range q, F depends on the range between lens 1 and object scene 3. This means that objects at ranges other than range q will be defocused and their signals will not be optimally processed in imager 4. Clock means 6, therefore, may include manual or electrical means 6a for adjusting frequency F to the desired range q, i.e, clock 6 includes variable means for changing the range focus of objects.

As described, object 5 moves in the direction x with velocity v relative to lens or antenna 1. The relative velocity v is obtained through object 5 motion, lens or antenna 1 motion, or combinations of both motions. Pulses appear at the output 11 of imager 4 which correspond one-for-one with objects 5 and these appear as each object 5 leaves beam 2. Each such pulse is the result of an integration of individual charges in photoelements of imager 4 due to object 5.

FIG. 5 illustrates the correspondence between closely spaced objects 5 crossing beam 2 and their corresponding output pulses 51 at the output 11 of imager 4. A single pulse 51 appears at the output 11 of imager 4 for each object 5 as it completes crossing beam 2. No pulses 52 appear when objects 5 are missing from a given location 53. The pulses 51 are separated by the distance s which is determined by the resolving power of the system. The height of pulses 51, also shown in FIG. 4C, is determined by the contrast of objects 5 when seen in the background of object scene 3, in coherent systems by the bandwidth-time product $N = BT$ and in noncoherent system by N.

If the lens or antenna 1 diameter is D, then the smallest angle between two objects 5 in object scene 3 is given approximately by $$\theta = \lambda/D \tag{2}$$

where D is the diameter of lens or antenna 1 and $\lambda$ is the wavelength. The angle $\theta$, of course, forms beam 2 and subtends the distance L at range q. Equation (2) defines the theoretical limit of resolution in a lens or antenna 1 limited by diffraction, when objects 5 being resolved are stationary with respect to the lens. When objects 5 cross beam 2 a synthetic aperture becomes possible and the resolution far exceeds the limit prescribed by equation (2).

In the prior imaging art using an image sensor 4 without synthetic aperture, the resolution is given by $$\theta_P = \theta/N \tag{3}$$

which results from the fact that each photoelement of the N-element imager 4 responds to a smaller fraction of the whole angle $\theta$, by a fraction 1/N. However, the resolution of the prior art given by equation (3) can be obtained only when objects 5 in object scene 3 are stationary or at best near-stationary since the prior art nowhere specifies using imager 4 to generate a synthetic aperture and, therefore, images become smeared when objects 5 move at speeds other than near-stationary. Thus, while the prior art using imager 4 has the potential to obtain a high resolution of images it is restricted to near-stationary motions of objects 5 at best.

It can be readily seen that the system of the present invention generates a synthetic aperture in a manner which is analogous to that employed by the prior synthetic aperture art. The difference being: while the prior art records on film and uses an optical computer to reproduce images with a high data capacity or first detecting and then using an electrical computer to produce images in real time but with a low data capacity, the present invention detects signals in imager 4 and uses imager 4 to produce images in real time with a high data capacity which results from the high spatial density of the N photoelements in imager 4. Moreover, unlike the conventional synthetic aperture, the synthetic aperture of the present invention is possible whether or not objects 5 themselves are coherent or not, and especially when object 5 is a broad spectrum noncoherent source, i.e., whether the system operates as a coherent or noncoherent system.

The peak of the pulse 51 appearing at the output 11 of imager 4 is about N times the pulse of a charge in a given photoelement of imager 4 when the system operates coherently and about $N^{\frac{1}{2}}$ times when the system operates noncoherently. The width of the pulse is T/N seconds where $T = L/v$. The angular resolution, therefore, of the system of the present invention is given by $$\theta_I = \theta/N \tag{4}$$

which is identical to that of the prior art using imagers without synthetic aperture, given by equation (3). Significantly, however, equation (4) of the present invention holds for high speed crossings of beam 2 by objects 5 whereas equation (3) of the prior imager art is limited to near-stationary motions of objects 5. Clearly, the system of the present invention extends the art to such fast crossing applications which cannot be imaged by the prior image sensor art or which cannot be imaged in real time or at high data capacity in the prior synthetic aperture art.

In a non-cooperative system, object 5 is any one of a natural or manmade object of interest while in a cooperative system, object 5 may assume the role of a label attached, built into or imprinted upon an object of interest such as a vehicle, container, box, carton, postal mail, stock certificate, etc., which itself moves in the direction x at speed v. Object 5 reflects or radiates coherently or noncoherently as a monochromatic, narrowband or broadband source. In some applications, object 5 may reflect a harmonic or subcarrier frequency of its illumination. In applications for identifying objects using labels, object 5 plays the role of a coded label which may take any one of a number of well known forms.

Labels are attached to objects being identified and may utilize any one of a number of well known codes. For example, microwave labels may be formed as arrays of half-wavelength metallic dipoles or slots having half-wavelength spacings and placed on the surface of a vehicle, or as arrays of resonators or code generators. Each dipole, slot or resonator may reflect a fundamental, subcarrier or harmonic frequency of its illumination, for example the harmonic reflector suggested in U.S. Pat. No. 3,781,879 to Staras and Shefer "Harmonic Radar Detecting and Ranging System for Automotive Vehicles" and in U.S. Pat. No. 3,631,484 to Augenblick "Harmonic Detection System". The dipoles slots or resonators may be coded individually or in combinations, for example as a binary code, with a unique code for each object to which the label is attached. On the other hand, optical labels may take any one of a number of well known forms, for example bar codes suggested in the paper by Whittaker and Sexton "Printers and Readers Handshake for Effective Bar Code Systems" appearing in the September, 1974 issue of Computer Design and in the paper by Yasaki "Bar Codes for Data Entry" appearing in the May, 1975 issue of Datamation. In general, object 5 when in the form of a label has a plurality of coded elements at selected locations in the label with the presence or absence of elements at code element locations comprising a code for each object to which the label is attached, and with a code element comprising a zone having a radiation characteristic different from that of the object background to which it is attached. Bar codes suitable for use are such as Pulse Width Modulated (PWM), F2F, Codabar TM, Universal Product Code (UPC), Two-out-of-Five, Interleaved Two-out-of-Five, and Code 39 and have been described in the report "Bar Codes: A General Background and Reference List" Report No 601322, June 11, 1975, Interface Mechanisms, Inc., Washington 98043. From the foregoing, the making, coding and using of object 5 as a label will be obvious to those skilled in the art.

Image sensor 4 can be arranged to form an area image sensor 60, as shown in FIG. 6, and thereby to provide high resolution images in the y-direction—perpendicular to the x-direction—as well. FIG. 6 shows M imagers 61–6M each being identical to the linear imager 4 of FIG. 1 and as seen in a top view, i.e., facing the object scene 3 from above. Clock 6 is connected to each of the imagers 61–6M. The system of FIG. 6 operates in a parallel mode in which optical data from M objects 5 at locations 1–M in the y-direction of object scene 3, corresponding to photoelements 1 of imagers 61–6M, is read into the area imager 60 in parallel and then is shifted in parallel through the N photoelements of imagers 61–6M so that area sensor 60 provides M outputs in parallel instead of the single output of linear image sensor 4 in FIGS. 1, 2, 3. In some applications, an M-bit shift register 61 may be provided so that each parallel transfer appearing at the output of area image sensor 60 may be read out as an M-bit line of data at the output 62 of readout shift register 61. Shift register 61 is controlled by clock 6 and operates at a rate M-times that of imagers 61–6M. Thus, the data output from area image sensor 60 can be read out in parallel directly from the output of area imager 60 or can be read out in series from the output 62 of readout shift register 61. In either case, the data can be viewed in a suitable display such as TV display 63 or can be further processed in a suitable data processor 63 such as a matched filter, correlator, convolver, etc. It should be understood that although imagers 61–6M have been indicated as being shifted by clock 6 to provide the serial readout of data to the output of imager 60 they may be shifted to provide the random address outputing of data to the output of imager 60. Also, while M outputs have been indicated for imager 60 one each for each imager 61–6M, each imager 61–6M may have N outputs one each for each photoelement, i.e., each imager 61–6M for providing N outputs.

It will be appreciated from the foregoing description of the apparatus and its operation that the invention provides an uncomplicated apparatus for generating a real time synthetic aperture using an image scanner. The apparatus comprises a focusing lens or antenna 1 for forming a receiving beam 2 of acoustical or electromagnetic energy, an image sensor 4 for detecting signals from objects through the lens and a clock 6 for shifting the image sensor 4 at the rate of motion of objects 5 in the object scene 3 of the lens. An object 5 in transit of the receiving beam 2 is detected by each photoelement of the image sensor 4. The clock 6 shifts the detected charges in photoelements of the image sensor 4 so that each photoelement or alternatively, to the output 11, accumulates detected signals from previous photoelements in synchronism with the rate of advance of object 5 through receiving beam 2. The image sensor 4 acts, therefore, as a recorder or detector of instantaneous images of object 5 and, as controlled by clock 6, as a signal processor, i.e., a matched filter or correlator processor which pulse compress spatial signals appearing in the photoelements. The output 11 of image sensor 4 represents the accumulation or integration of instant detections of the object 5 by the individual photoelement and appears as a pulse with a pulse appearing for each object 5 crossing the receiving beam 2. The output of image sensor 4 can be used in an output display 63 for viewing and recording images of the object scene 3 in real time or can be processed in a data processor 63 for detecting and correlating desired images. In some applications a coherent or noncoherent transmitter 8 for illuminating objects 5 and/or a stable local oscillator 8, 33 for operating the system as a coherent system are provided, i.e., for referencing signals being detected by image sensor 4. In other applications the apparatus may be provided with a variable clock means 6 for changing the range focus of objects. Yet in other applications the apparatus may include a coded label attached to an object for identifying the object, with a plurality of labels with a label for each object being identified. In this manner, the system of the invention generates a synthetic aperture in real time of monochromatic, narrowband or broadband signals from objects 5 and having small size, weight, power consumption and cost as compared to the prior synthetic aperture art and having non-blurring of images as compared to the prior imaging art using image sensors and, therefore, extending the range of application for such devices.

Turning now to a description of the method of the invention, the method comprises the steps of focusing an object scene 3 through a lens or antenna 1 onto an image sensor 4; detecting signals from objects 5 in object scene 3 in the image sensor 4; and shifting the image sensor 4 at the rate of motion of objects 5 in the object scene 3 of lens 1. The method can be modified by including the step of illuminating objects 5 with a coherent or noncoherent transmitter 8. The method can be further modified by including the step of generating a stable local frequency for referencing signals being detected by image sensor 4. The method can be further modified by including the step of operating the system at one of an acoustical, microwave or optical frequencies. The method can also be modified by including the step of varying the shifting of the image sensor 4 by clock 6 for changing the range focus of objects 5. Finally, the method can be modified by including the steps of: providing a plurality of labels with a label for each object; and attaching coded labels to objects for identifying objects with a code.

To the extent that the system is implemented to operate in one dimension x it can serve in applications for the identification of objects using labels and for speed measurement; object identifiers are obtained by implementing object 5 as a label, for example as a group of objects 5 arranged in a suitable code which can be read by the system operating as an interrogator or code reader; object speed is obtained by using equation (1) to obtain speed when all other parameters are known. To the extent to which the system is implemented with area imager 60 to operate in the two dimensions x, y, it can serve in applications such as real time surveillance, reconnaissance and ground mapping of targets by aircraft and satellites, medical imaging, automatic motion compensation of cameras, reading of documents and the automatic recognition of letters and patterns by small and efficient imagers.

From the foregoing it will be appreciated that, in addition to the uncomplicated apparatus, the invention also provides an uncomplicated method for generating a real time synthetic aperture using image scanners. The apparatus requires few wires or electrical connections for implementing image sensor 4 as a signal processor and thus contrasting with the large requirement for same in the prior art synthetic aperture systems using eletrical filters. As a consequence, very small size, weight, power consumption and cost of apparatus is required to implement the present invention over the prior art systems having the same object sensing and resolving capabilities. Clearly, the optical and microwave embodiments of FIGS. 1, 2, 3 of the invention require minimal power for operating imager 4 and clock 6 and only small amounts of power for operating the balance of the system. Also, the real time operation of the system of the present invention contrasts to the off-line operation of a conventional synthetic aperture using optical post detection matched filtering. Yet the signal and data capacity of the present invention approach that for the conventional system using optical processing. This is by virtue of the fact that photoelements in imager 4 have high packing densities. In general, therefore, the system of the invention produces these results at a fraction of the conventional size, weight, power consumption and cost while combining the best features of the prior synthetic aperture art (real time operation and high data capacity) and the prior imaging art using image scanners (compactness) and having none of the prior art disadvantages (two step time-consuming image reproduction using optical signal processing, low data capacity using electrical signal processing, blurring of images using image sensors). If the efficiency of a synthetic aperture is defined as the inverse product of its size, weight, power consumption and cost, the overall efficiency of the present invention over the prior art is over 1000% in real time imaging of objects at comparable sensing, resolving and motion levels. From this brief comparison of the improved efficiency of the invention over the prior art apparatus and methods, it will be appreciated that the invention is suitable for use where prior art systems were unsuitable. For example, the high resolution which has been demonstrated by airborne synthetic aperture can now be obtained using satellites which up to now have been limited in their size, weight and power capacities for using the conventional systems. But even more significantly, the invention extends the benefits of synthetic aperture to the commercial sector in such applications as high motion and speed sensing and reading of documents, information transfer, medical imaging and automatic vehicle identification using labels, industrial and materials identification systems using labels, postal mail and stock certificate bar code readers, point-of-sale systems, and in all such applications where small size, weight, power consumption and costs of high resolution imagers are required.

It will be appreciated by those skilled in the art and others that various modifications can be made within the scope of the invention. For example, the invention can be operated at any one of an acoustic (low or high frequency sound) or electromagnetic (radio, microwave, millimeter, infra-red, optical, ultraviolet) frequencies. And, a variety of image sensors 4, 60 are available for implementing the invention, i.e., for implementing the combination of imager 4, 60 and clock 6 to obtain an image scanner. And, amplitude and phase tapering and range compensating lenses can be included between lens 1 and imager 4, 60 to weight signals appearing at the face of imager 4, 60 or to compensate for slant range in the well known manner of conventional synthetic aperture. And, a variety of clock means 6 and synchronizing frequency cycles F are available to implement the invention. In particular, clock means 6 may include addressing means for addressing photoelements in imager 4, 60, for example when operating imager 4, 60 in a random address readout mode. And, a variety of architectures and technologies are known and these may be used to implement imager 4, 60. And, a variety of well known output display devices 63, for example TV displays, may be used. And, a variety of well known data processors 63, for example matched filters and correlators can be used to carry out the invention. Hence, the invention can be practiced otherwise than has been specifically described herein.

What is claimed is:

1. In a system for generating a synthetic aperture, the improvement comprising:

one of a lens or antenna of acoustical or electromagnetic energy for focusing a receiving beam, with said receiving beam providing for viewing an object scene;

an image sensor having as input the output of said lens or antenna for detecting signals from objects in relative motion in said object scene, said signals representing one of illuminations or radiations of said objects, said image sensor having a plurality of photoelements each providing an electric charge signal in response to an input signal, and including means for shifting a charge signal from an element; and clock means connected to said image sensor for shifting the image sensor at the rate of motion of objects in said object scene, said shifting of said clock means providing at the output of said image sensor a pulse for each object crossing said receiving beam, with said pulse representing the image of said object.

2. The system of claim 1 including one of a coherent or noncoherent transmitter for forming a transmitting beam, said transmitting beam providing for illuminating said object scene.

3. The system of claim 1 including a stable local oscillator for illuminating said image sensor or, alternatively, connected to a transmitter and a receiver, for referencing signals being detected by said image sensor.

4. The system of claim 1 including variable clock means for changing the range focus of objects.

5. The system of claim 1 including means inserted between said lens or antenna and said image sensor for operating said system at one of an acoustical or electromagnetic frequencies.

6. The system of claim 1 including output display means having as input the output of said image sensor, said output display means providing for viewing and recording images of said object scene.

7. The system of claim 1 including output data processor means having as input the output of said image sensor, said output data processor means providing for detecting and correlating images of said object scene.

8. The system of claim 1 including:

coded labels for identifying objects in said object scene, with said coded labels attached to said objects, with a plurality of labels with a label for each object being identified.

9. A method of generating a synthetic aperture comprising the steps of:

focusing an object scene through a focusing unit onto an image sensor having a plurality of photoelements each providing an electric charge signal in response to an input signal;

detecting in the image sensor, signals from objects in relative motion in the object scene of said focusing unit, said signals representing one of illuminations or radiations of said objects; and shifting the image sensor at the rate of motion of objects in said object scene, said shifting providing an output pulse for each object crossing the field of view of said focusing unit, said pulse representing the image of said object.

10. The method of claim 9 including the step of illuminating objects with one of a coherent or noncoherent transmission.

11. The method of claim 9 including the step of generating a stable local frequency for referencing signals being detected by said image sensor.

12. The method of claim 9 including the step of varying the shifting rate of said image sensor for changing the range focus of objects.

13. The method of claim 9 including the step of inserting means between said focusing unit and said image sensor for operating said synthetic aperture at one of an acoustical or electromagnetic frequencies.

14. The method of claim 9 including the step of viewing the output of said image sensor in an output display.

15. The method of claim 9 including the step of one of detecting or correlating the output of said image sensor with desired images of said object scene in an output data processor.

16. The method of claim 9 including the steps of:

providing coded labels;

attaching coded labels to objects for identifying objects with a code; and providing a plurality of labels with a label for each object.

17. In a system for generating a synthetic aperture, the improvement comprising:

a coherent transmitter for forming a transmitting beam providing for illuminating an object scene;

one of a lens or antenna of acoustical or electromagnetic energy for focusing a receiving beam, with said receiving beam providing for viewing said object scene;

an image sensor having as input the output of said lens or antenna for detecting signals from objects in relative motion in said object scene, said signals representing one of illuminations or radiations of said objects, said image sensor having a plurality of photoelements each providing an electric charge signal in response to an input signal, and including means for shifting a charge signal from an element; and clock means connected to said image sensor for shifting the image sensor at the rate of motion of objects in said object scene, said shifting of said clock means providing at the output of said image sensor a pulse for each object crossing said receiving beam, with said pulse representing the image of said object.

18. The system of claim 17 including a stable local oscillator for illuminating said image sensor or, alternatively, connected to a transmitter and a receiver, for referencing signals being detected by said image sensor.

19. The system of claim 17 including variable clock means for changing the range focus of objects.

20. The system of claim 17 including means inserted between said lens or antenna and said image sensor for operating said system at one of an acoustical or electromagnetic frequencies.

21. The system of claim 17 including output display means having as input the output of said image sensor, said output display means providing for viewing and recording images of said object scene.

22. The system of claim 17 including output data processor means having as input the output of said image sensor, said output data processor means providing for detecting and correlating images of said object scene.

23. The system of claim 17 including coded labels for identifying objects in said object scene, with said coded labels attached to said objects, with a plurality of labels with a label for each object being identified.

24. A method of generating a synthetic aperture comprising the steps of:
   illuminating objects in an object scene with a coherent transmission;
   focusing an object scene through a focusing unit onto an image sensor having a plurality of photoelements each providing an electric charge signal in response to an input signal;
   detecting in the image sensor, signals from objects in relative motion in the object scene of said focusing unit,
   said signals representing one of illuminations or radiations of said objects; and
   shifting the image sensor at the rate of motion of objects in said object scene,
   said shifting providing an output pulse for each object crossing the field of view of said focusing unit,
   said pulse representing the image of said object.

25. The method of claim 24 including the step of generating a stable local frequency for referencing signals being detected by said image sensor.

26. The method of claim 24 including the step of varying the shifting rate of said image sensor for changing the range focus of objects.

27. The method of claim 24 including the step of inserting means between said focusing unit and said image sensor for operating said synthetic aperture at one of an acoustical or electromagnetic frequencies.

28. The method of claim 24 including the step of viewing the output of said image sensor in an output display.

29. The method of claim 24 including the step of one of detecting or correlating the output of said image sensor with desired images of said object scene in an output data processor.

30. The method of claim 24 including the steps of:
   providing coded labels;
   attaching coded labels to objects for identifying objects with a code; and
   providing a plurality of labels with a label for each object.

31. In a system for generating a synthetic aperture, the improvement comprising:
   one of a lens or antenna of acoustical or electromagnetic energy for focusing a receiving beam,
   with said receiving beam providing for viewing an object scene;
   an image sensor having as input the output of said lens or antenna for detecting signals from objects in relative motion in said object scene,
   said signals representing one of illuminations or radiations of said objects, said image sensor having a plurality of photoelements each providing an electric charge signal in response to an input signal, and including means for shifting a charge signal from an element;
   clock means connected to said image sensor for shifting the image sensor at the rate of motion of objects in said object scene,
   said shifting of said clock means providing at the output of said image sensor a pluse for each object crossing said receiving beam,
   with said pulse representing the image of said object; and
   coded labels for identifying objects in said object scene, with said coded labels attached to said objects, with a plurality of labels with a label for each object being identified.

32. The system of claim 31 including a stable local oscillator for illuminating said image sensor or, alternatively, connected to a transmitter and a receiver, for referencing signals being detected by said image sensor.

33. The system of claim 31 including variable clock means for changing the range focus of objects.

34. The system of claim 31 including means inserted between said lens or antenna and said image sensor for operating said system at one of an acoustical or electromagnetic frequencies.

35. The system of claim 31 including output display means having as input the output of said image sensor,
   said output display means providing for viewing and recording images of said object scene.

36. The system of claim 31 including output data processor means having as input the output of said image sensor,
   said output data processor means providing for detecting and correlating images of said object scene.

37. A method of generating a synthetic aperture comprising the steps of:
   focusing an object scene through a focusing unit onto an image sensor having a plurality of photoelements each providing an electric charge signal in response to an input signal;
   detecting in the image sensor, signals from objects in relative motion in the object scene of said focusing unit,
   said signals representing one of illuminations or radiations of said objects;
   shifting the image sensor at the rate of motion of objects in said object scene,
   said shifting providing an output pulse for each object crossing the field of view of said focusing unit,
   said pulse representing the image of said object;
   providing coded labels;
   attaching coded labels to objects for identifying objects with a code; and
   providing a plurality of labels with a label for each object.

38. The method of claim 37 including the step of generating a stable local frequency for referencing signals being detected by said image sensor.

39. The method of claim 37 including the step of varying the shifting rate of said image sensor for changing the range focus of objects.

40. The method of claim 37 including the step of inserting means between said focusing unit and said image sensor for operating said synthetic aperture at one of an acoustical or electromagnetic frequencies.

41. The method of claim 37 including the step of viewing the output of said image sensor in an output display.

42. The method of claim 37 including the step of one of detecting or correlating the output of said image sensor with desired images of said object scene in an output data processor.

43. In a system for generating a synthetic aperture, the improvement comprising:
   one of a lens or antenna of acoustical or electromagnetic energy for focusing a receiving beam,
   with said receiving beam providing for viewing an object scene;

an image sensor having as input the output of said lens or antenna for detecting signals from objects in relative motion in said object scene, said signals representing one of illuminations or radiations of said objects, said image sensor having a plurality of photoelements each providing an electric charge signal in response to an input signal, and including means for shifting a charge signal from an element;

means inserted between said lens or antenna and said image sensor for operating said system at one of an acoustical or electromagnetic frequencies; and clock means connected to said image sensor for shifting the image sensor at the rate of motion of objects in said object scene, said shifting of said clock means providing at the output of said image sensor a pulse for each object crossing said receiving beam, with said pulse representing the image of said object.

44. The system of claim 43 including a stable local oscillator for illuminating said image sensor or, alternatively, connected to a transmitter and a receiver, for referencing signals being detected by said image sensor.

45. The system of claim 43 including variable clock means for changing the range focus of objects.

46. The system of claim 43 including output display means having as input the output of said image sensor, said output display means providing for viewing and recording images of said object scene.

47. The system of claim 43 including output data processor means having as input the output of said image sensor, said output data processor means providing for detecting and correlating images of said object scene.

48. A method of generating a synthetic aperture comprising the steps of:

focusing an object scene through a focusing unit onto an image sensor having a plurality of photoelements each providing an electric charge signal in response to an input signal;

detecting in the image sensor, signals from objects in relative motion in the object scene of said focusing unit, said signals representing one of illuminations or radiations of said objects;

inserting means between said focusing unit and said image sensor for operating said synthetic aperture at one of an acoustical or electromagnetic frequencies; and shifting the image sensor at the rate of motion of objects in said object scene, said shifting providing an output pulse for each object crossing the field of view of said focusing unit, said pulse representing the image of said object.

49. The method of claim 48 including the step of generating a stable local frequency for referencing signals being detected by said image sensor.

50. The method of claim 48 including the step of varying the shifting rate of said image sensor for changing the range focus of objects.

51. The method of claim 48 including the step of viewing the output of said image sensor in an output display.

52. The method of claim 48 including the step of one of detecting or correlating the output of said image sensor with desired images of said object scene in an output data processor.

* * * * *